US006184905B1

(12) United States Patent
Hartog

(10) Patent No.: US 6,184,905 B1
(45) **Date of Patent: *Feb. 6, 2001**

(54) METHOD AND APPARATUS FOR PROCESSING VIDEO GRAPHICS INFORMATION AT DIFFERENT OPERATING RATES

(75) Inventor: Adrian Henry Hartog, Toronto (CA)

(73) Assignee: ATI Technologies, Thornhill (CA)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/871,215

(22) Filed: Jun. 9, 1997

(51) Int. Cl.[7] .................... G06F 13/16

(52) U.S. Cl. .................... 345/521; 345/526

(58) Field of Search .................... 345/501, 507–509, 345/521, 526, 213; 395/551–553, 556, 872; 713/400, 401, 501; 709/400; 710/52

(56) References Cited

U.S. PATENT DOCUMENTS

| | | | | |
|---|---|---|---|---|
| 4,463,443 | * | 7/1984 | Frankel et al. | 395/880 |
| 5,402,148 | * | 3/1995 | Post et al. | 345/132 |
| 5,559,533 | * | 9/1996 | Hicok et al. | 345/162 |
| 5,748,203 | * | 5/1998 | Tang et al. | 345/521 |
| 5,781,768 | * | 7/1998 | Jones, Jr. | 395/556 |

* cited by examiner

*Primary Examiner*—Raymond J. Bayerl
*Assistant Examiner*—Sy D. Luu
(74) *Attorney, Agent, or Firm*—Markison & Reckamp, P.C.

(57) ABSTRACT

A method and apparatus for processing video data at various optimum operating rates is accomplished by a video graphics circuit that includes a video graphics module, a buffer and a memory interface, where the video graphics module, which may be a graphical user interface (GUI), is operated at a first clock rate and the memory interface is operated at a second clock rate. In this circuit, the buffer temporarily stores data, such that communications with the memory interface are done at the second clock rate while communications with the video graphics module are done at the fist clock rate.

16 Claims, 5 Drawing Sheets

METHOD AND APPARATUS FOR PROCESSING VIDEO GRAPHICS INFORMATION AT DIFFERENT OPERATING RATES

FIELD OF THE INVENTION

This invention relates generally to video graphics circuits and more particularly to a method and apparatus for processing video data between a video module and video memory, where the video module operates at a different rate than the operating rate of video memory.

BACKGROUND OF THE INVENTION

The transfer of digital data between digital circuits is well known. Depending on the type of digital circuit, the transfer of the digital data may be done in a synchronous manner or an asynchronous manner. For example, if the digital circuits are logic circuits (i.e., circuits that consist of a plurality of logic gates such as NOR gates, AND gates, etc.) the digital data can be transferred asynchronously. In other words, as soon as the logic circuits have performed their function upon the digital data, they may present the manipulated digital data to the next logic circuit for its processing. It is also well known that logic circuits may transfer the digital data in a synchronous manner by including latches at the input and output of the logic circuits. With these synchronous logic circuits, when the input latch is activated, the digital data is received by the logic circuit which then processes the digital data. The manipulated digital data is not provided as an output until the output latch is triggered, or clocked. At this time, the manipulated digital data is presented to the input of the next logic circuit.

When the digital data is being transferred between a processing device, such as a microprocessor, digital signal processor (DSP), processing circuit, or the like, and a memory device, the data transfer is done in a synchronous manner. To synchronize the processing device and the memory device, both are coupled to the same clock, thereby assuring that the data is transferred in a controlled and reliable manner. While operating the memory device and the processing device from the same clock works well when both device have approximately the same operating rate (i.e., the speed at which the device can assimilate data), it is inefficient to operate the devices from the same clock when they have substantially different operating rates. The inefficiency arises in that it is desirable to have each device operating at, or near, its maximum operating rate, such that it can process as much data as possible in a given time period. With the substantial differences in the operating rates, the faster device usually has to wait for the slower device to assimilate its data before performing its function or the system containing the devices would need to operate at a rate equal to the slowest of the devices.

To transfer data efficiently between low speed devices (operating rates less than 100 KHz) and high speed devices (operating rates above 10 MHz), the data is buffered such that each device can read and/or write to and from the buffer at its maximum speed. A display refresh module in a video graphics circuit communicating data with video memory is an example of a different speed device communicating with another device using buffering. In this example, however, the communicating of the data is a continuous read of the data, not a discontinuous read/write function.

In the video graphics processing technology, video graphics processing modules (such as graphical user interface modules, desktop display modules, video scaling module, video capture module, etc.) have substantially the same operating rate as the video memory. Typically, these modules and the video memory are coupled to a master clock of 50–83 MHz. As such, the transfer of digital data between the modules and the video memory is done in a discontinuous data burst manner at a common operating rate. A new development, however, is occurring within the video graphics art as the operating rate of the video memory is surpassing the operating rate of the video modules. For example, video memory may soon have an operating rate (i.e., be able to read and/or write data) of 100–150 MHz.

This increase in video memory operating rate presents a new and interesting problem to the video graphics art, in that, the operating rate of the video modules will soon be much slower than the video memory. As is well understood in the art, video modules, such as the graphical user interface, have a limited operating rate due to the complex digital logic they employ. Even using the latest digital logic integrated circuit techniques, the logic circuits can only switch so fast, thus limiting the speed of the graphical user interface to about 80 MHz. If a video graphics circuit includes a graphical user interface that operates at about 80 MHz and video memory that operates at 150 MHz, it would be inefficient to slow the video memory down just to accommodate the graphical user interface.

One potential solution to overcome the above mentioned inefficiency is to redesign the graphical user interface module into many more smaller logical circuits which are less complex and can therefore process the data faster. While this will provide the needed increase in speed, it requires the graphical user interface to include considerably more latching circuits to clock the data into and out of the smaller digital logic sections. Such an increase in components consequently increases the size of the circuit and its power consumption; two issues IC designers continually fight to reduce. As such, redesigning the graphical user interface, or any other video module, in this manner is not a desirable solution due to the increase in size and power consumption.

Another issue is that the speed of various video memory technologies differs greatly. As one can appreciate, the cost of video memory is largely dependent upon its speed. If a system were built that included video memory that operated at 50 MHz, it would be undesirable to slow down the rest of the graphical user interface which is capable of operating at 80 MHz.

Therefore, a need exists for a method and apparatus that allows video graphics modules and video memory to operate at optimum operating rates without an increase in power consumption or an increase in the size of the modules.

DETAILED DESCRIPTION OF THE DRAWINGS

Generally, the present invention provides a method and apparatus for processing video data at various optimum operating rates. This may be accomplished by a video graphics circuit that includes a video graphics module, a buffer and a memory interface, where the video graphics module, which may be a graphical user interface (GUI), is operated at a first clock rate and the memory interface is operated at a second clock rate. In this circuit, the buffer temporarily stores data, such that communications with the memory interface are done at the second clock rate while communications with the video graphics module are done at the fist clock rate. With such a method and apparatus, a video graphics circuit, and/or system, can have its components operating at optimum rates thereby enabling the video graphics circuit to process more video data in a more efficient manner.

Figure 1:
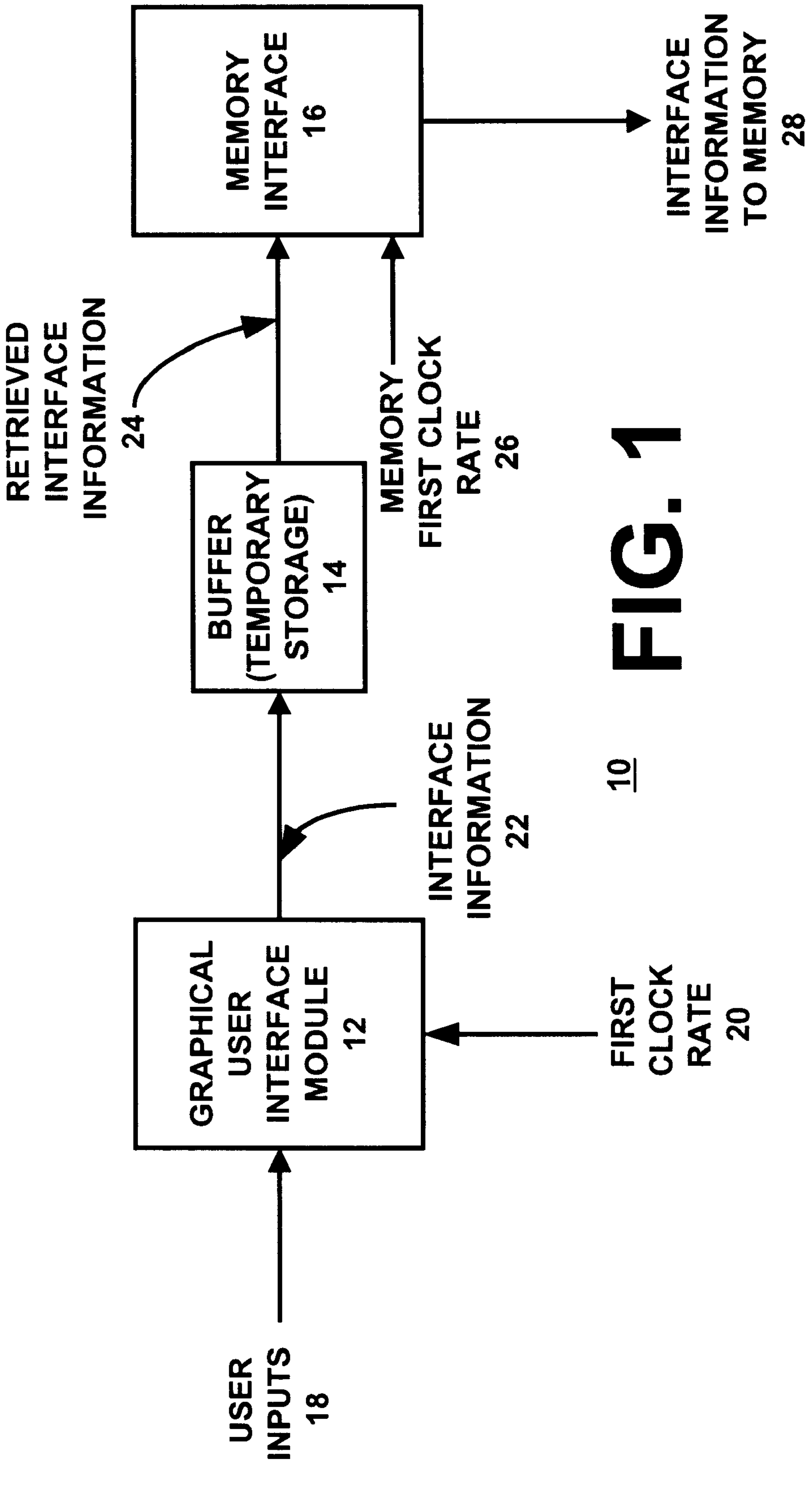
FIG. 1 illustrates a schematic block diagram of a video graphics circuit which is in accordance with the present invention.

The present invention can be more fully described with reference to FIGS. 1–5. FIG. 1 illustrates a schematic block diagram of a video graphics circuit 10 which includes a graphical user interface (GUI) module 12, a buffer 14, and a memory interface 16. As shown, the GUI module 12 is coupled to receive user inputs 18 and processes is them at a first clock rate 20, which is typically in the range of 50–83 MHz. Such user inputs may be cursor movements, re-arranging the computer desktop, clicking to select or deselect an icon, activating a pull-down menu and a plurality of other graphical user interface operations.

The GUI module 12 outputs the processed user inputs 18 as interface information 22 which is subsequently stored in the buffer 14. The storage of the interface information 22 is done at the first clock rate 20, thus enabling the GUI module 12 to operate at its optimum rate. Once the interface information 22 is stored in the buffer 14, it may be retrieved by the memory interface 16 at the memory clock rate 26, which may be in the range of 50 MHz to several hundred MHz and is set for optimum performance of the memory to which the memory interface 16 is coupled. The retrieved interface information 24 is subsequently provided to memory 28.

Conversely, information to be retrieved from the memory by the GUI interface 12 is done the reverse manner. The memory interface 16 receives such information from the memory at the memory clock rate 26 and stores it in the buffer 14. Once stored, the GUI module 12 may retrieve it at the first clock rate 20. As such, by employing the buffer 14 between the GUI module 12 and the memory interface 16, which may be coupled to video memory, each component is operating at its optimum rate and improving the efficiency of the video graphics circuit 10.

Figure 2:
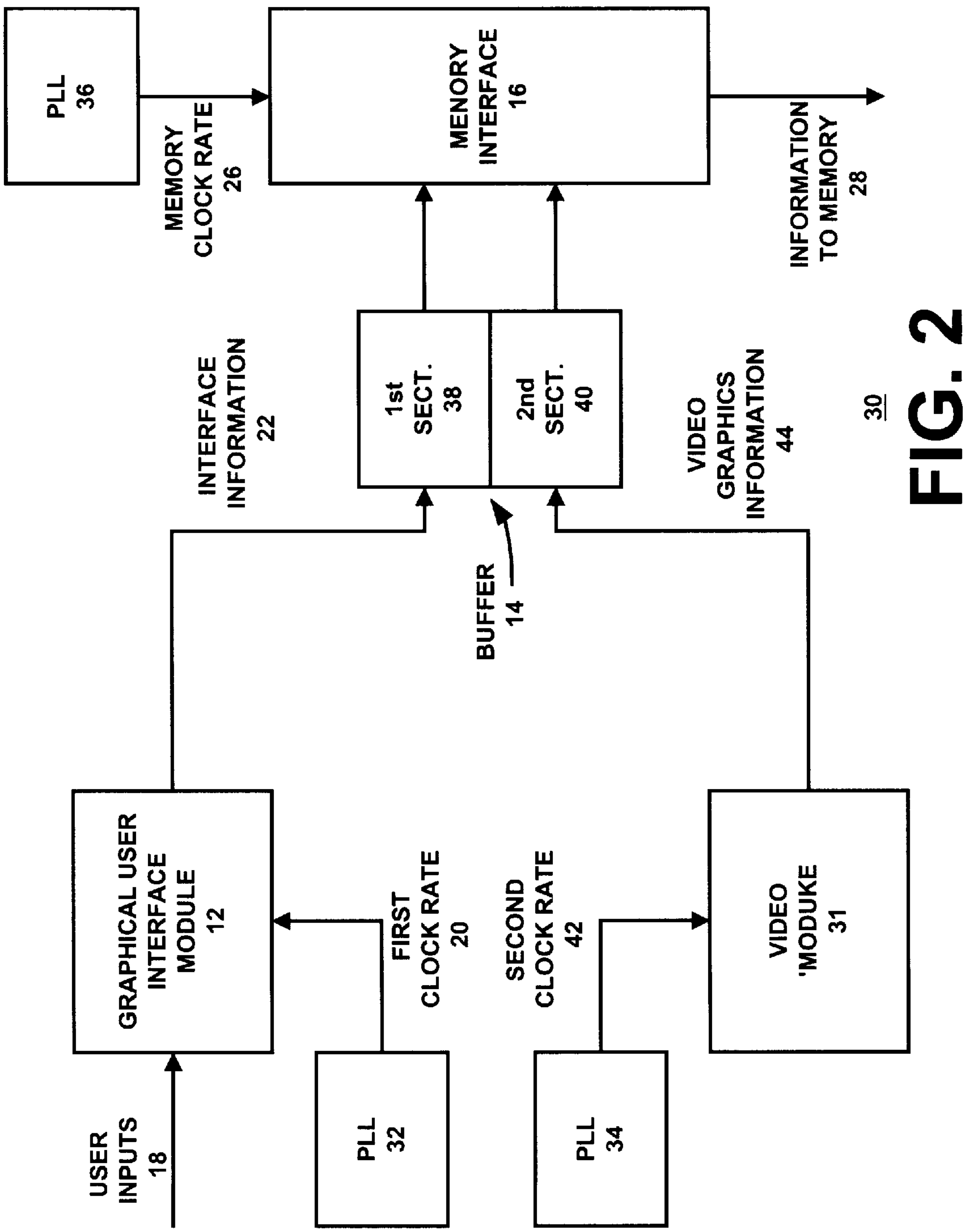
FIG. 2 illustrates a schematic block diagram of an alternative video graphics circuit which is in accordance with the present invention.

FIG. 2 illustrates a schematic block diagram of an alternative video graphics circuit 30 which includes the GUI module 12, the buffer 14, the memory interface 16, a plurality of phase locked loops (PLL) 32, 34, 36 and a video module 31. Each of the PLLs provides a different clock signal from the same reference clock or different reference clocks. (Typically, there will only be one reference clock, that being the system master clock.) As shown, PLL 32 generates a first clock which provides the first clock rate 20; PLL 34 generates a second clock which provides the second clock rate 42; and PLL 36 generates a third clock which provides the memory clock rate 26. As one skilled in the art will readily appreciate, the clocks generated by the PLLs 32, 34, 36 may be asynchronous or synchronous of each other.

As is also shown, the buffer 14 includes two sections 38 and 40, where section 38 is coupled to the GUI module 12 and the memory interface 16, while section 40 is coupled to the video module 31 and the memory interface 16. The operation of this circuit 30 is very similar to the operation of the circuit 10 in FIG. 1, in that, the buffer 14, which may be a first-in first-out buffer, temporarily stores the interface information 22 and video graphics information 44 at the rate of the associated module and provides the information to the memory interface at the memory clock rate 26.

The video module 31 may be, but is not limited to, a video scaling module, a video capture module, a desktop module, or a window module. The video graphics information 44 produced by the video module is generally pixel information in the range of eight bits per pixel to thirty two bits per pixel. Note that, while the GUI module 12 and the video module 31 are shown to have different clocks, they may both operate from the same clock if the operating rates of both are approximately equal.

Figure 3:
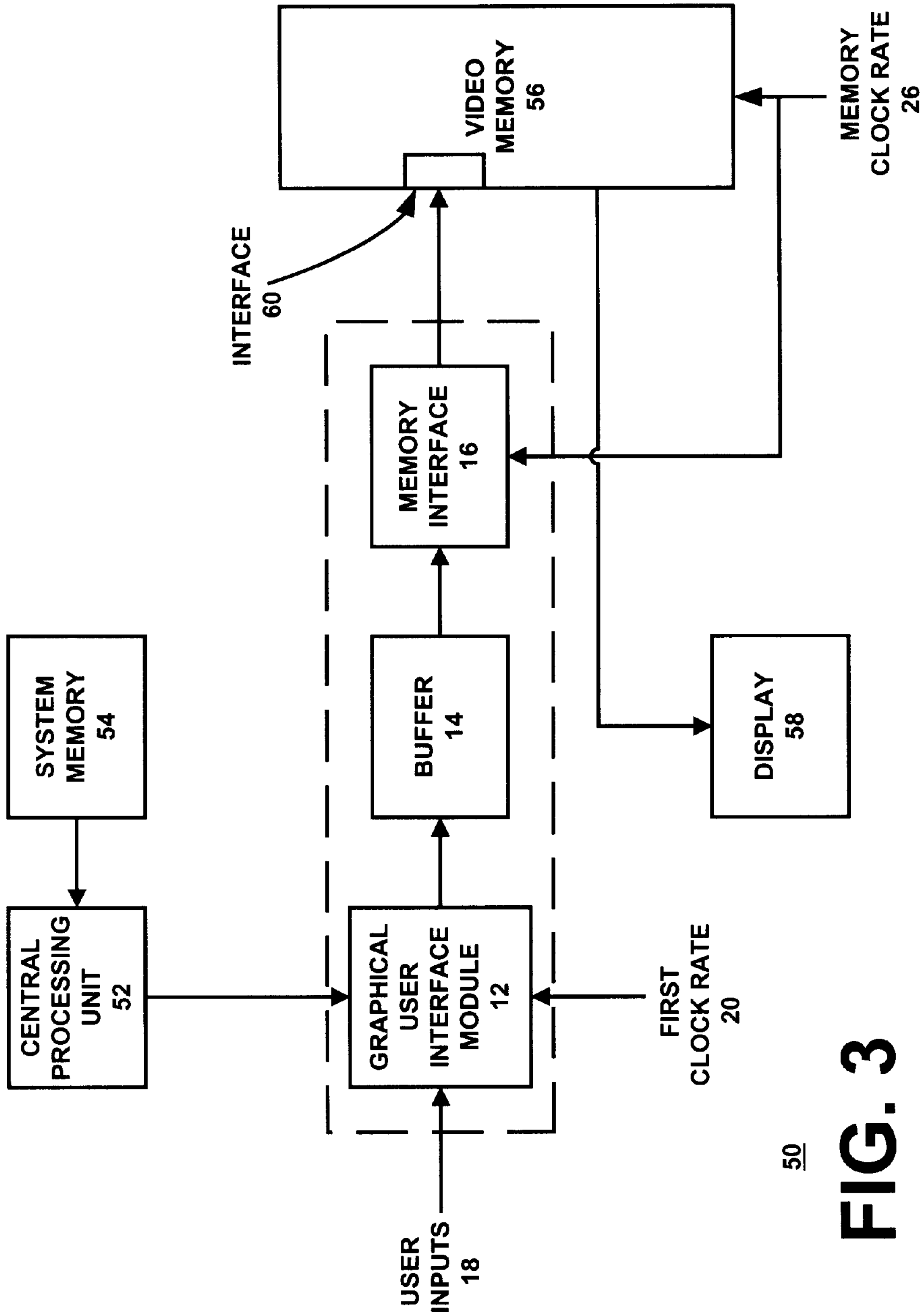
FIG. 3 illustrates a schematic block diagram of a video graphics system which is in accordance with the present invention.

FIG. 3 illustrates a schematic block diagram of a video graphics system 50 which includes a video graphics circuit 10, a central processing unit 52, system memory 54, video memory 56, and a display 58. Such a system 50 is commonly found in, but not limited to, personal computers, work stations, personal digital assistants, television sets, video game systems, or any device that has a monitor. In such a system 50, the video graphics circuit 10 includes the GUI module 12, the buffer 14, and the memory interface 16. As shown, the GUI module 12 operates at the first clock rate 20, while the memory interface 16 and the video memory operate at the memory clock rate 26.

In operation, the central processing unit 52 generates a plurality of instructions and data values while executing programming instructions stored in the system memory 54. Some of these instructions and data values may be provided to the GUI module 12 for further processing. (Such processing may be done in combination with the user inputs 18 or independently of such inputs 18). The GUI module 12 processing the received data at the first clock rate 20 and provides the resulting information to the buffer 14. In turn, the memory interface 16 retrieves the resulting information at the memory clock rate and provides it to the video memory 56 via the interface 60. Subsequently, the information stored in the video memory 56 is provided to the display 58 for presentation. Note that, with the increase in read/write capabilities of the video memory 56, the amount of pixel information stored therein can be increased, thus providing video graphics designers an almost endless possibility of visual presentation enhancements.

While the components of system 50 are shown to be discrete components, one skilled in the art will readily appreciated that the central processing unit 52, the system memory 54, the video graphics circuit 10, and the video memory 56 may be implemented as integrated circuits. Such a skilled person will further appreciate that these components may be implemented in separate integrated circuits, in the same integrated circuit, or any combination thereof.

Figure 4:
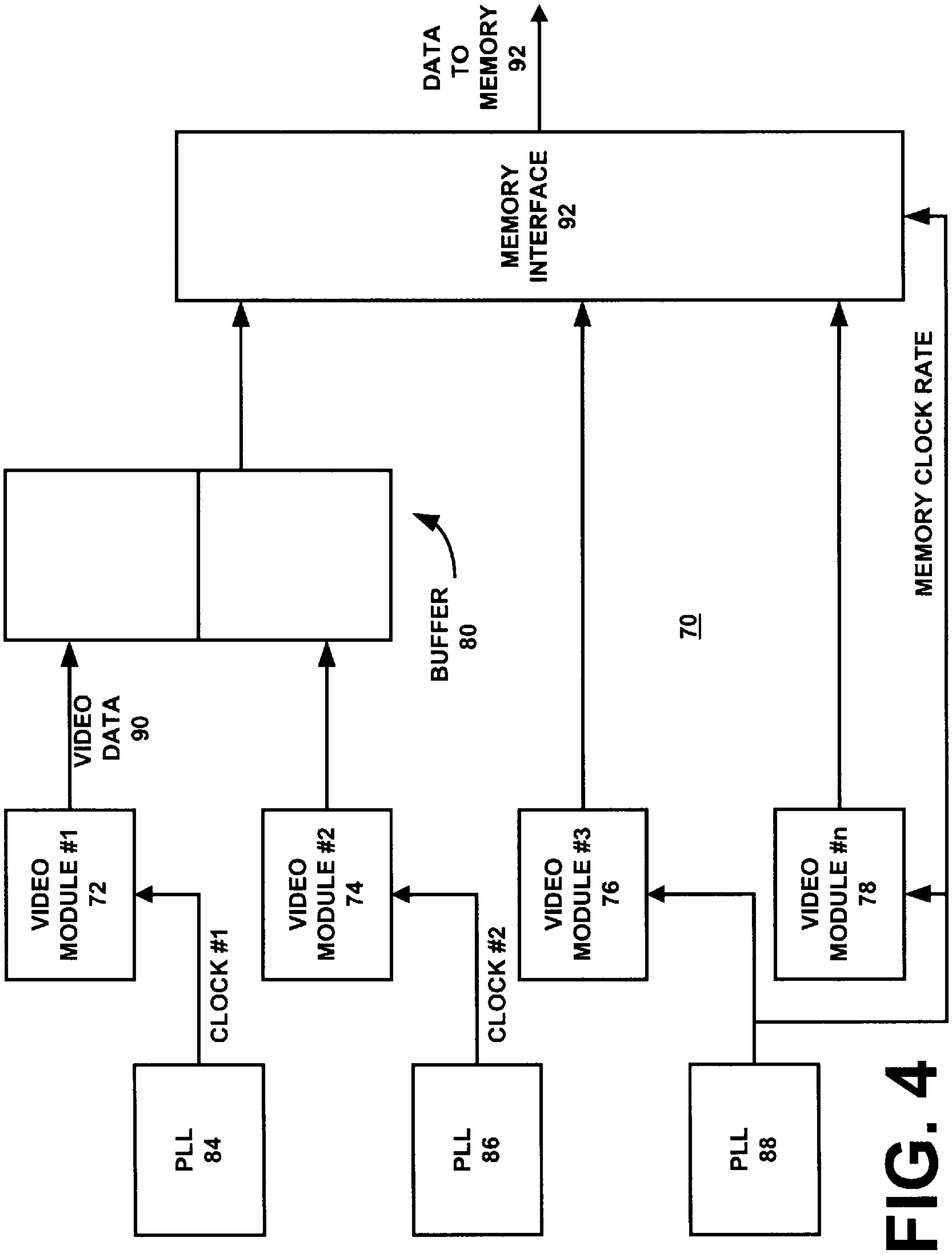
FIG. 4 illustrates a schematic block diagram of another alternate video graphics circuit which is in accordance with the present invention.

FIG. 4 illustrates a schematic block diagram of another alternate video graphics circuit 70 which includes a plurality of video modules 72, 74, 76, and 78, a buffer 80, a memory interface 82, and a plurality of PLLs 84, 86, and 88. In this configuration, the video modules may be, but are not limited to, graphical user interface, video scaling module, desktop module, video capture module, or window module, where some of the modules are directly coupled to the memory interface 82, while others are buffered. The video modules 76 and 78 that are directly coupled to the memory interface 82 have an operating rate approximately equal to the memory coupled to the memory interface, thus these modules can utilize the same clock rate at the memory interface. The other video modules 72 and 74, however, have an operating rate that is different than the memory. As such they utilize separate clocks and supply the video data 90 they produce to the buffer 80. From there, the operation is as discussed above.

Figure 5:
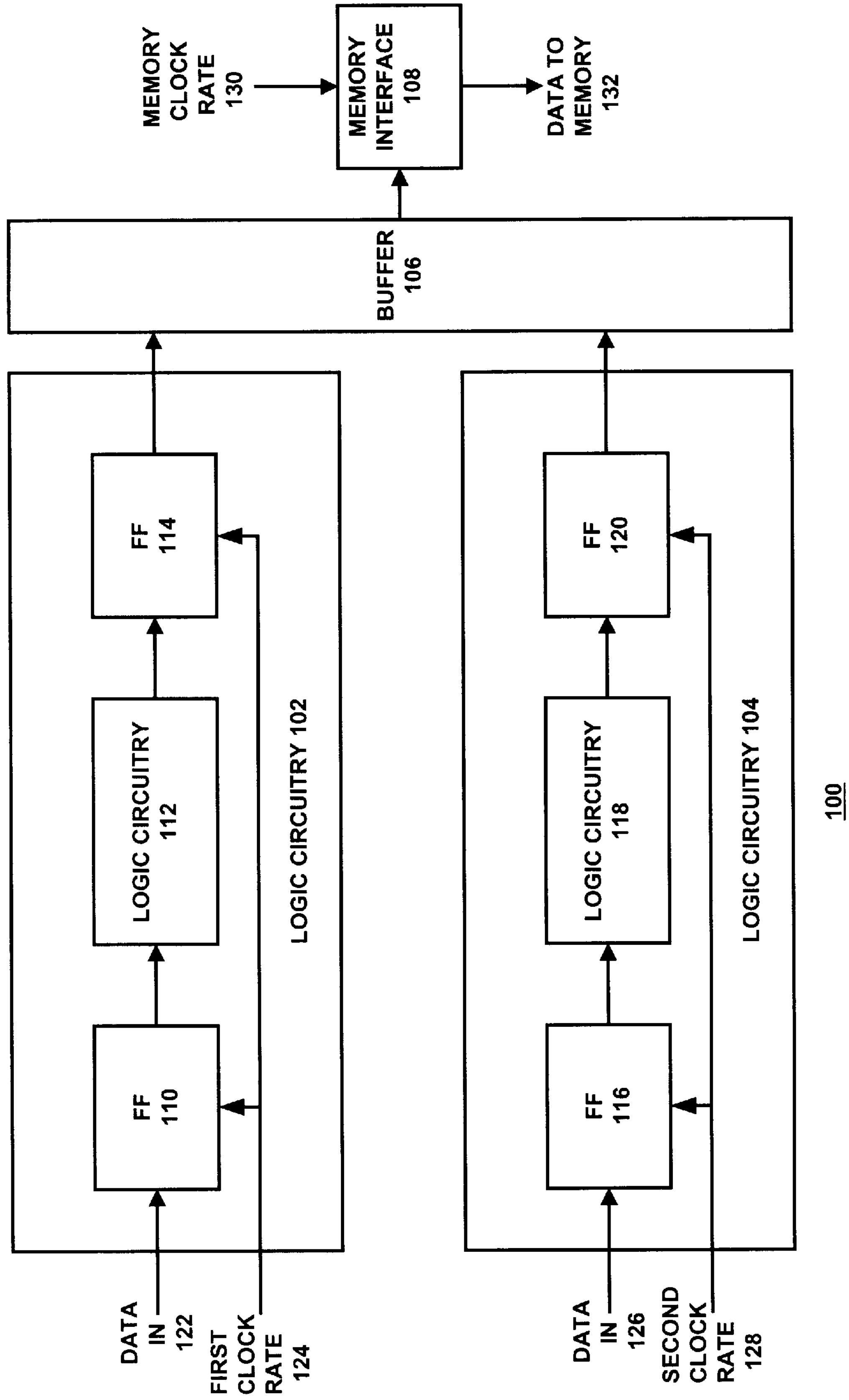
FIG. 5 illustrates a schematic block diagram of a complex logic circuit which is in accordance with the present invention.

FIG. 5 illustrates a schematic block diagram of a complex logic circuit 100 which includes a first logic circuit 102, a second logic circuit 104, a buffer 106, and a memory interface 108. Each of the logic circuits 102 and 104 are shown to include an input flip-flop 110 and 116, logic circuitry 112 and 118, and an output flip-flop 114 and 120. The input flip-flops 110 and 116, at their respective clock rates 124 and 128, input data 122 and 126 into the logic circuitry 112 and 118. The logic circuitry 112 and 118 perform their logical operations upon the data 122 and 126 and provide the resulting data to the buffer 106, via the output flip-flops 114 and 120. The resulting data is subsequently provided to the memory interface 108 at the memory clock rate 130 and, in turn, provided to a memory device 132. As one skilled in the are will readily appreciate, the logic circuitry 112 and 118 may be an almost endless list of logic circuit combinations.

The preceding discussion has presented a video graphics circuit and system that optimizes performance of various components by decoupling them. Such decoupling is achieved by buffering components that have substantially different operating rates such that the slower components do not delay the faster ones. This also allows the IC designer to optimize the speed of each component independently of the other components. Thus, the method and apparatus of the present invention improve the efficiency of video graphics circuits and systems with the buffering technique so described. In summary, these advantages are obtained via a video graphics circuit that includes a video graphics module, a buffer and a memory interface, where the video graphics module, which may be a graphical user interface (GUI), is operated at a first clock rate and the memory interface is operated at a second clock rate. In this circuit, the buffer temporarily stores data, such that communications with the memory interface are done at the second clock rate while communications with the video graphics module are done at the fist clock rate.

What is claimed is:

1. A video graphics circuit comprising:

a graphical user interface module that operates at a first clock rate, wherein the graphical user interface generates interface information based on user inputs;

a buffer coupled to the graphic user interface module, wherein the buffer temporarily stores the interface information at the first clock rate; and a memory interface coupled to the buffer, wherein the memory interface retrieves the interface information from the buffer and provides the interface information to a memory at a memory clock rate, wherein the memory clock rate is substantially greater than the first clock rate, wherein the memory interface subsequently retrieves the interface information from the memory at the memory clock rate and provides the retrieved interface information to the buffer, and wherein the graphical user interface retrieves the retrieved interface information from the buffer at the first clock rate;

a video module that operates at a second clock rate, wherein the video module generates video graphics information which is provided to the buffer for temporary storage, and wherein the buffer provides the video graphics information to the memory, via the memory interface, at the memory clock rate, wherein the memory interface subsequently retrieves the video graphics information from the memory at the memory clock rate and provides the retrieved video graphics information to the buffer, and wherein the video module retrieves the retrieved video graphics information from the buffer at the second clock rate.

2. The video graphics circuit of claim 1 further comprises a video module that operates at a second clock rate, wherein the video module generates video graphics information which is provided to the buffer for temporary storage, and wherein the buffer provides the video graphics information to the memory, via the memory interface, at the memory clock rate, wherein the memory interface subsequently retrieves the video graphics information from the memory at the memory clock rate and provides the retrieved video graphics information to the buffer, and wherein the video module retrieves the retrieved video graphics information from the buffer at the second clock rate.

3. The video graphics circuit of claim 2 further comprises, within the buffer, a first buffer section for temporarily storing the video graphics information and a second buffer section for temporarily storing the interface information.

4. The video graphics circuit of claim 1 further comprises the graphical user interface operating at the first clock rate which is asynchronous with the memory clock rate.

5. The video graphics circuit of claim 1 further comprises the graphical user interface module operating at the first clock rate which is synchronous with the memory clock rate.

6. The video graphics circuit of claim 1 further comprises the graphical user interface module operating at the first clock rate which is a given ratio with respect to the memory clock rate.

7. The video graphics circuit of claim 1 further comprises a first phase locked loop that generates the first clock rate and a second phase locked loop that generates the memory clock rate.

8. The video graphics circuit of claim 1 further comprises the graphical user interface module operating at the first clock rate which is set for optimum performance of the graphical user interface module and the memory interface operating at the memory clock rate which is set for optimum performance of reading and writing from/to the memory.

9. A video graphics system comprising:

central processing unit;

system memory coupled to the central processing unit;

video memory that operates at a memory clock rate; and a video graphics circuit coupled to the video memory and to the central processing unit, wherein the video graphics circuit includes:

a graphical user interface module that operates at a first clock rate, wherein the graphical user interface generates interface information based on inputs from the central processing unit;

a buffer coupled to the graphic user interface module, wherein the buffer temporarily stores the interface information at the first clock rate; and a memory interface coupled to the buffer, wherein the memory interface retrieves the interface information from the buffer and provides the interface information to the video memory at the memory clock rate, wherein the memory clock rate is substantially greater than the first clock rate, wherein the memory interface subsequently retrieves the interface information from the memory at the memory clock rate and provides the retrieved interface information to the buffer, and wherein the graphical user interface retrieves the retrieved interface information from the buffer at the first clock rate.

10. The video graphics system of claim 9 further comprises a display coupled to the video graphics circuit.

11. The video graphics system of claim 9 further comprises, within the video memory, an interface coupled to provide reading/writing of the interface data.

12. A video graphics circuit comprising:

a plurality of video modules, wherein each of the plurality of video graphic modules generates corresponding video data, and wherein each of the plurality of video graphic modules operates at corresponding clock rate;

a buffer coupled to more than one of the plurality of video graphics modules, wherein the buffer temporarily stores the corresponding video data of the more than one of the plurality of video graphic modules at the corresponding clock rate; and a memory interface coupled to the buffer, wherein the memory interface retrieves the corresponding video data of the plurality of video graphic modules from the buffer and provides the corresponding video data of the plurality of video graphics modules to a memory at a memory clock rate, wherein the memory clock rate is substantially greater than the corresponding clock rate, wherein the memory interface subsequently retrieves the corresponding video data from the memory at the memory clock rate and provides the retrieved corresponding video data to the buffer, and wherein at least one of the plurality of video graphic modules retrieves corresponding video data from the buffer at the corresponding clock rate.

13. The video graphics circuit of claim 12 further comprises, within the plurality of video modules, a graphical user interface module as one of the plurality of video modules.

14. The video graphics circuit of claim 12 further comprises a plurality of phased locked loops operably coupled to a corresponding one of the plurality of video modules, wherein the plurality of phased locked loops provide the corresponding clock rate for the plurality of video modules.

15. A method for processing video graphics data via different clock rate operations, the method comprising the steps of:

a) generating graphical user interface data at a first clock rate in the range of 50 MHz to 83 MHz, wherein the first clock rate is set to provide optimum generation of the graphical user interface data;

b) buffering the graphical user interface data at the first clock rate to produce first buffered graphical user interface data;

c) retrieving the first buffered graphical user interface data at a second clock rate in the range of 50 MHz to 200 MHz to produce first retrieved buffered graphical data, wherein the second clock rate is set for optimum retrieval of memory;

d) storing, at the second clock rate, the first retrieved buffered graphics data in memory to produce first stored graphics data;

e) subsequently retrieving the first stored graphics data at the second clock rate to produce second retrieved graphics data;

f) buffering the second retrieved graphics data at the second clock rate to produce second buffered graphics data; and g) providing the second buffered graphics data to a graphical user interface at the first clock rate.

16. The method of claim 15 further comprising:

generating video data at a third clock rate, wherein the third clock rate is set for optimum generation of the video data;

buffering the video data to produce first buffered video data;

retrieving the first buffered video data at the second clock rate to produce first retrieved video data;

storing the first retrieved video data in memory at the second clock rate to produce first stored video data;

subsequently retrieving the stored video data at the second clock rate to produce second retrieved video data;

buffering the second retrieved video data at the second clock rate to produce second buffered video data; and providing the second buffered data to a video module at the first clock rate.

* * * * *